United States Patent [19]

Agarwal et al.

[11] 4,385,141

[45] May 24, 1983

[54] HOT MELT ADHESIVE COMPOSITIONS

[75] Inventors: Pawan K. Agarwal, Westfield; Warren A. Thaler, Aberdeen, both of N.J.

[73] Assignee: Exxon Research and Engineering Co., Florham Park, N.J.

[21] Appl. No.: 323,421

[22] Filed: Nov. 20, 1981

[51] Int. Cl.³ .............................................. C08L 95/00
[52] U.S. Cl. ...................................... 524/66; 524/211; 524/212; 524/230; 524/251; 524/284; 524/425; 524/399; 525/54.5; 525/232
[58] Field of Search ............... 525/54.5, 232; 524/399, 524/211, 212, 230, 284, 251, 425, 66

[56] References Cited

U.S. PATENT DOCUMENTS 3,801,531  4/1974  Berejka et al. ...................... 428/290
3,867,247  2/1975  O'Farrell ............................. 428/246
4,014,831  3/1977  Bock et al. .......................... 524/399
4,157,992  6/1979  Lundberg et al. .................. 524/399

*Primary Examiner*—Melvyn I. Marquis
*Attorney, Agent, or Firm*—Richard E. Nanfeldt

[57] ABSTRACT

This invention relates to hot melt adhesive compositions which include a neutralized sulfonated 1,2-syndiotactic polybutadiene resin which has about 5 to about 25 meq. of neutralized sulfonate groups per 100 grams of the neutralized sulfonated 1,2-syndiotactic polybutadiene, and about 25 to about 250 parts by weight of a hydrocarbon resin of a petroleum or coal tar distillate, having about 5 to about 6 carbon atoms the hydrocarbon resin being composed of aliphatic dienes and mono-olefins per 100 parts by weight of the neutralized sulfonated 1,2-syndiotactic polybutadiene polymer.

8 Claims, No Drawings

4,385,141

HOT MELT ADHESIVE COMPOSITIONS

BACKGROUND OF THE INVENTION

1. Field of the Invention

This invention relates to hot melt adhesive compositions which include a neutralized sulfonated 1,2-syndiotactic polybutadiene resin which has about 5 to about 50 meq. of neutralized sulfonate groups per 100 grams of the neutralized sulfonated polybutadiene, and about 25 to about 250 parts by weight of a hydrocarbon resin of a petroleum or coal tar distillate, having about 5 to about 6 carbon atoms the hydrocarbon resin being composed of aliphatic dienes and monoolefins per 100 parts by weight of the neutralized sulfonated 1,2-syndiotactic terpolymer.

Broadly speaking, synthetic adhesives used in packaging can be classified into four categories: water-based, solvent-based, reactive and hot melt adhesives. Of these four, currently the water-based are used most extensively. Usually, the water-based adhesives are based on emulsion polymers and are applied to porous cellulosic substrates. Energy from the outside in some fashion is applied to the system to evaporate the water in order that a strong bond may be formed. Beside this energy requirement for the formation of the bond, there is another complication with the use of water-based adhesive. For a uniform coating, a good uniform wetting of the substrate surface is desired, which is not easily achieved.

With the solvent-based adhesives, usually a good wetting is achieved; however, their use has been becoming extremely restrictive due to expensive energy requirements for the evaporation of organic solvents fire hazards associated with the use of these organic solvents and emissions problems with said solvents. The strict government environmental regulations and restrictions concerning worker's exposure to solvent vapors, etc., has placed extra pressure on the packager to use non solvent-based adhesives.

Recently, the use of hot melt adhesives has been growing very rapidly in the packaging industry. The hot melt adhesives are generally applied (as the name implies) by conventional extrusion or coating techniques in the temperature range of 250° to 450° F. on one of the surfaces to be bonded. The other surface is brought in contact with the hot surface for a sufficient period of time for the melt to cool, whereupon solidification of a strong and durable bond is formed.

The key requirements of resins suitable for hot melt adhesive applications are that they should have good physical properties, e.g., tensile strength, etc., at ambient conditions, and they can flow easily at fabrication temperatures. The ethylene vinyl acetate (EVA) copolymers and styrene block copolymers, such as Kraton, have been extensively used as hot melt adhesives; however, their use has been limited largely to pressure sensitive adhesives.

There is a significant demand in the market today for polymer systems which exhibit good green strength or tensile properties at ambient temperatures which, when heated to a predetermined temperature, will give good flow such that they may be applied to a coating or substrate by melt extrusion or other suitable techniques. In the past, it has been common to employ organic solutions as a way of applying a coating of a polymer system which is designed to have good adhesive properties. This practice is now under considerable pressure, due to the fact that the organic solvents must be evaporated from the coating giving rise to pollution problems and excess energy requirements.

PRIOR ART

Several U.S. Patents have described sulfonated polymers such as sulfonated Butyl and sulfonated EPDM in adhesive applications (e.g., U.S. Pat. No. 3,867,247 and U.S. Pat. No. 3,801,531). It is important to distinguish the instant invention over those prior art systems. The former patent is directed at a sulfonated Butyl cement which is solvent-based and is employed to laminate various substrates. It is important to note that the instant invention differs dramatically from that patent as follows:

(a) The adhesives of the instant invention are not deposited from solvents but are hot melt, and require no solvents in their preferred method of utilization.

(b) The instant invention may optionally include a preferential plasticizer capable of associating with the metal sulfonate groups and thereby reducing the melt viscosity of the resulting blends to make the systems more processable.

(c) The instant invention is directed at sulfonated 1,2-syndiotactic polybutadiene, whereas most of the prior art deals with sulfonated Butyl rubber or sulfonated EPDM terpolymers (e.g., U.S. Pat. No. 3,867,247).

Historically, polybutadiene systems do not possess good tack properties and substantial art exists directed towards improving the adhesive characteristics of such systems. This problem becomes even more acute when polybutadiene is sulfonated to levels of 5 to 50 meq. per 100 grams of polymer and neutralized. The resulting compositions have been widely used as the basis for thermoplastics elastomers (i.e., U.S. Pat. Nos. 4,157,992; 4,014,831, etc.). The use of these materials in such applications is, in part, a demonstration that the properties of such materials are just the opposite of those desired for adhesive. In fact, such materials are remarkably devoid of tack or adhesion. The task, therefore, of converting such physically cross-linked materials into suitable adhesive candidates is a particularly challenging one for three reasons: (a) the crystalline 1,2-syndiotactic polybutadiene backbone is particularly unsuited for that purpose being a very dry elastomer; (b) it has relatively high Tg ($\sim 25°$ C.); (c) the strong associations attributable to metal sulfonate cross-links further inhibit adhesion to any particular substrate.

Despite these handicaps, there are some very good reasons for solving the problems associated with converting sulfonated polybutadiene into a good hot melt adhesive composition. Due to the inherent crystallinity and high glass temperature of the syndiotactic polybutadiene, the hot melt adhesive compositions based on such polymers are expected to have both long time and temperature stability. Most adhesives, based on other elastomeric backbones, can suffer degradation under prolonged temperatures and storage.

SUMMARY OF THE INVENTION

This invention relates to hot melt adhesive compositions which include a neutralized sulfonated 1,2-syndiotactic polybutadiene resin which has about 5 to about 50 meq. of neutralized sulfonate groups per 100 grams of the neutralized sulfonated polybutadiene, and about 25 to about 250 parts by weight of a hydrocarbon resin of a petroleum or coal tar distillate, having about 5 to about 6 carbon atoms, the hydrocarbon resin being composed of aliphatic dienes and monolefins per 100 parts by weight of the neutralized sulfonated 1,2-syndiotactic polybutadiene polymer.

GENERAL DESCRIPTION

The present invention relates to unique and novel hot melt adhesive compositions which comprise a blend of a neutralized sulfonated 1,2-syndiotactic polybutadiene resin and a hydrocarbon resin, wherein an ionic preferential plasticizer oil, and/or a filler can be optionally added to the compositions, thereby modifying the rheological and physical properties of the hot melt adhesive compositions.

A. Sulfonated 1,2-Syndiotactic Polybutadiene and Process for Forming

In general, the process for forming a gel-free sulfonated 1,2-syndiotactic polybutadiene is dependent upon the use of an acetyl sulfate sulfonating agent which is free of residual sulfuric acid. The use of an acetyl sulfate sulfonating agent which contains residual sulfuric acid will cause gelation of the 1,2-syndiotactic polybutadiene during the sulfonating process. The instant invention process for the sulfonation of the 1,2-syndiotactic polybutadiene comprises the steps of: reacting anhydrous acetic anhydride with concentrated sulfuric acid to form an acetyl sulfate which is free of residual sulfuric acid, wherein the volume ratio of the acetic anhydride to sulfuric acid is about 1/1 to about 10/1, more preferably about 1.2/1 to about 2/1, dissolving the formed acetyl sulfate in a critically selected solvent to form a solution of the acetyl sulfate; and adding the solution of the acetyl sulfate to a cement of the 1,2-syndiotactic polybutadiene at a sufficient temperature and for a sufficient period of time to effect sulfonation; quenching the cement of the sulfonated 1,2-syndiotactic polybutadiene, and recovering the sulfonated 1,2-syndiotactic polybutadiene from the cement.

The 1,2-syndiotactic polybutadiene, which are useful in the instant application, have an Mn as measured by GPC of about 10,000 to about 500,000, more preferably about 10,000 to about 300,000 and most preferably about 20,000 to about 100,000. An especially useful 1,2-syndiotactic polybutadiene is distributed by UniRoyal, designated as RB-820, and has an Mn as measured by GPC of about 100,000 and 1,2 unit content of about 92 percent and a degree of crystallinity of about 25 percent. Other examples of useful syndiotactic 1,2-polybutadiene includes UniRoyal's RB-810 and RB-830 with 90 and 93 percent 1,2-content and 18 and 29 percent crystallinity, respectively.

The cement of the 1,2-syndiotactic polybutadiene is formed by dissolving of 1,2-syndiotactic polybutadiene in a critically selected solvent which is selected from the group consisting of methylene chloride, and dichloroethane, wherein methylene chloride is preferred. Nonhalogenated aliphatic and aromatic hydrocarbons are not useful in the instant process due to solubility problems with respect to the acetyl sulfate which is being added to the cement. The concentration of the 1,2-syndiotactic polybutadiene in the cement is about 2 to about 40 grams per 100 ml of solvent, more preferably about 5 to about 25, and most preferably about 10 to about 20 grams per 100 ml. of solvent.

The acetyl sulfate which is free of residual sulfuric acid is formed by the reaction of anhydrous acetic anhydride with concentrated sulfuric acid at a temperature of about $-50°$ to about 50° C., more preferably about $-25$ to about 35 and most preferably about $-10°$ to about 25° C. for a period of time of about 1 to about 6 minutes, more preferably about 5 to about 30, and most preferably about 5 to about 15 minutes. The concentrated sulfuric acid (96%) is added slowly with stirring to the anhydrous acetic anhydride in a vessel until the contents are homogeneous. The resultant acetyl sulfate, which is free of residual sulfuric acid, is diluted with the anhydrous methylene chloride thereby forming a solution of the acetyl sulfate, wherein the concentration of the acetyl sulfate is about 1 to about 50 grams per 100 ml of methylene chloride, more preferably about 5 to about 30 and most preferably about 10 to about 20.

The solution of the acetyl sulfate is added slowly to the stirred cement of 1,2-syndiotactic polybutadiene at a temperature of about $-50°$ to about 40° C., more preferably about $-10$ to about 30, and most preferably about 20° to about 30° C. Upon the completion of the addition of the acetyl sulfate to the cement of the 1,2-syndiotactic polybutadiene, the sulfonation reaction is terminated after about 5 to about 120 minutes, more preferably about 10 to about 6, and most preferably about 15 to about 45, by the addition of a quenching agent to the cement of the sulfonated polybutadiene.

The quenching agent can be aliphatic alcohol such as methanol, ethanol, isopropanol; and aromatic hydroxyl compound such as phenol; a cycloaliphatic alcohol such as cyclohexanol or with water.

The unneutralized sulfonated polybutadiene polymer has about 5 to about 100 meq. sulfonate groups per 100 grams of sulfonated 1,2 polybutadiene polymer, more preferably about 10 to about 40, and most preferably about 12 to about 35. The meq. of sulfonate groups per 100 grams of polymer is determined by both titration of the polymeric sulfonate and Dietert Sulfur analysis. In the titration of the sulfonate, the polymer is dissolved in solvent consisting of 95 parts of toluene and 5 parts of methanol at a concentration level of 50 grams per liter of solvent. The sulfonation polymer is titrated with ethanolic sodium hydroxide.

The unneutralized sulfonated polymer is gel-free and hydrolytically stable. Gel is measured by stirring a given weight of polymer in a solvent comprised of 95 toluene/5 methanol at a concentration of 5 weight percent for 24 hours, allowing the mixture to settle, withdrawing a weighed sample of the supernatant solution and evaporating to dryness.

Hydrolytically stable means that the acid function in this case, the sulfonic acid, will not be eliminated under neutral or slightly basic conditions to a neutral moiety which is incapable of being converted to highly ionic functionality.

Neutralization of the unneutralized sulfonated 1,2-polybutadiene polymer is done by the addition of a solution of a basic salt to the unneutralized sulfonated polybutadiene polymer dissolved in the mixture of the aliphatic alcohol and nonreactive halogenated solvent system or, alternatively, neutralization can be readily effected by employing ammonia or a primary, secondary, or tertiary aliphatic amine or an aromatic amine or a quaternary ammonium base. The basic salt is dissolved in a binary solvent system consisting of water and/or aliphatic alcohol. The counterion of the basic salt is selected from the group consisting of ammonium, antimony, aluminum, lead and Groups I-A, II-A, I-B or II-B of the Periodic Table of Elements and mixtures thereof. The anion of the basic salt is selected from the group consisting of a carboxylic acid having from about 1 to about 4 carbon atoms, a hydroxide or alkoxide and mixtures thereof. The preferred neutralizing agent is a metal acetate, more preferably zinc acetate. Sufficient metal salt of the carboxylic acid is added to the solution of the unneutralized sulfonated polymer to effect neutralization. It is preferable to neutralize at least 95 percent of the sulfonate groups, more preferably about 98 percent, most preferably about 100 percent. Ammonia or amines may be added either in a liquid or gaseous form or in a solvent such as an alcohol.

B. Plasticizers

The metal sulfonate-containing polymers at higher sulfonate levels can possess extremely high melt viscosities and are thereby difficult to process. The optional addition of ionic group (preferential) plasticizers markedly reduces melt viscosity and frequently enhances physical properties. To the neutralized sulfonated 1,2-syndiotactic polybutadiene polymer is added, in either solution or to the crumb of the sulfonated 1,2-syndiotactic polybutadiene polymer, a preferential plasticizer selected from the group consisting of carboxylic acids having about 5 to about 30 carbon atoms, more preferably about 8 to about 22 carbon atoms, or basic salts of these carboxylic acids, wherein the metal ion of the basic salt is selected from the group consisting of aluminum, ammonium, lead and Groups IA, IIA, IB and IIB of the Periodic Table of Elements and mixtures thereof. The carboxylic acids are selected from the group consisting of lauric, myristic, palmitic or stearic acids and mixtures thereof; e.g., zinc stearate, magnesium stearate, or zinc laurate.

The preferential plasticizer is incorporated into the hot melt adhesive composition at about 1 to about 50 parts by weight based on 100 parts by weight of the neutralized sulfonated 1,2-syndiotactic polybutadiene polymer, more preferably at about 2 to about 25 and most preferably at about 3 to about 20. The metallic salt of the carboxylic acid can also be used as a neutralizing agent. In the case of the neutralizing agent and plasticizer being the identical chemical species, additional metallic salt is added over the required levels of neutralization. Alternatively, other preferential plasticizers are selected from amines, amides such as stearamide, ammonium and amine salts of carboxylic acids and mixtures thereof. The preferred plasticizers are selected from carboxylic acids having about 8 to about 22 carbon atoms or metallic salts of these carboxylic acids and mixtures thereof. The resultant neutralized sulfonated elastomeric polymer with preferential plasticizer is isolated from the solution by conventional steam stripping and filtration.

C. Commercial Tackifier Resins

To the hot melt adhesive composition is added a commercial tackifying resin having a softening point of about 0° to about 160° C., more preferably about 50° to about 140° C. and most preferably about 70° to 120° C. A variety of commercial tackifier resins are available. Some of these resins contain α and/or β pinene base polyterpene resins as the main ingredient while others are derived from the polymerization of petroleum or coal distillates which consists of aliphatic dienes, mono- and diolefins and cyclic olefins having about 5 to about 6 carbon atoms. The latter type of tackifiers having primarily piperlene and/or isoprene structure. A general, but excellent, description of tackifying resins derived from Petroleum derivatives can be found in, for example, *Encyclopedia of Polymer Science and Technology*, Vol. 9, Pages 853 to 860, chapter by John Findlay, Published by John Wiley & Sons, N.Y. (1968).

Typical, but nonlimiting tradenames of these commercial tackifiers are Wingtak of Goodyear, Escorez of Exxon, Piccolyte of Hercules and Zonrez of Arizona Chemicals. Recently, these and various other companies have also started marketing relatively higher softening point resins. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often their initial color (Gardner) is about 3.0 to about 7.0 and the density from about 0.7 to 1.0 gm/cm$^3$ at room temperature. The acid number of these resins is usually less than 1. In general, the molecular weight of these commercial tackifying resins is not homogeneous. The number average molecular weight (Mn) as measured by GPC can be from about 300 to about 5000 and more preferably about 500 to about 2000 and most preferably about 700 to 1600.

As well-known to those familiar with the use of tackifying resins, because of their wide range compatability, any of them can be used with sulfonated polymers in proper formulation, which will yield adhesive systems of varying physical characteristics. To cite an example in the present invention, the tackifying resins used are those based on hydrocarbon resins.

These hydrocarbons tackifier resins are incorporated into the hot melt adhesive composition at about 25 to about 250 parts by weight per 100 parts by weight of the neutralized sulfonated 1,2-syndiotactic polybutadiene polymer, more preferably about 30 to about 125 and most preferably about 35 to about 100.

D. Method of Forming Blend Adhesive Composition

The blend compositions of the neutralized sulfonated elastomeric polymers of EPDM terpolymer and polybutadiene with or without preferential plasticizer and the hydrocarbon tackifier resin can be formed by techniques well-known in the art. For example, the blend composition of the hot melt adhesive can be compounded on a hot two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrell Continuous Mixer, a twin screw extruder, or tandem extrusion techniques which are continuous mixing types of equipment. The Banbury mixing device is the preferred batch-type mixer, and the twin screw extruder is the preferred continuous mixer.

E. Extended Blend Adhesive Composition

To the blend compositions of the hot melt adhesive compositions can be added fillers which are selected from the group consisting of talcs, ground calcium carbonate, water precipitated calcium carbonate, delaminated, calcined or hydrated clays, silicas and carbon blacks, and mixtures thereof. These fillers are incorporated into the blend composition at about 1 to about 150 parts by weight per 100 parts by weight of the neutralized sulfonated 1,2-syndiotactic polybutadiene polymer, more preferably at about 20 to about 150; and most preferably at about 30 to about 100. Typically, these fillers have a particle size of about 0.03 to about 20 microns, more preferably about 0.3 to about 10, and most preferably about 0.5 to about 10. The oil absorption, as measured by grams of oil absorbed by 100 grams of filler, is about 10 to about 100, more preferably about 10 to about 85 and most preferably about 10 to about 75. Typical fillers employed in this invention are illustrated in Table I.

F. Oil Extended Adhesive Compositions

It is observed that the blend composition of the instant invention can also include oils to further improve low temperature properties and tack characteristics of the resulting adhesive levels of oil of less than about 50 parts by weight per 100 parts of the neutralized sulfonated 1,2-syndiotactic polybutadiene polymer rubber can be incorporated, more preferably about 1 to about 25 parts. Oils are particularly useful when high levels of petroleum resin tackifiers are used since such materials can harden the resulting composition. Oils can further soften and reduce the cost. Typical oils that can be used may be low viscosity aromatic, naphthenic or paraffinic petroleum oils, having less than 2 weight percent polar type compounds. Typical oils are illustrated in Table II.

organic or inorganic in nature. Most generally, these materials are those which are customarily employed in pressure sensitive tapes, either the cloth or paper backed types or tape backings made of synthetic materials, for example, polyesters such as the copolymer of ethylene glycol with terphthalic acid, vinyls such as copolymer of vinylidene chloride and vinyl chloride, or a copolymer of vinylidene chloride with acrylonitrile, cellophane, cellulose acetate, polyvinyl chloride, polyvinyl acetate, polypropylene, polyethylene, ethylene-propylene plastic copolymer. Sheetings and tapes of cloth or textiles of either natural or synthetic fiber origin, such as glass fiber cloth, wood, and finally sheets or strips of metals such as steel, copper, aluminum, and alloys thereof can also be employed. In general, the backing employed are those which have heretofore been conventionally employed in preparing pressure sensitive labels, tapes, sheetings and the like and the selection of any particular substrate material is not a specific novel feature of the of the present invention.

DETAILED DESCRIPTION OF THE INVENTION

The advantages of the hot melt adhesive compositions of the present invention can be more readily appreciated by reference to the following examples and tables. Unless otherwise specified, all measurements are in parts per hundred by weight.

EXAMPLE 1

TABLE I

| Filler | Code # | Oil Absorption Grams of oil/100 Grams of Filler | Specific Gravity | Avg. Particle Size Micron | pH |
|---|---|---|---|---|---|
| Calcium Carbonate Ground | Atomite | 15 | 2.71 | | 9.3 |
| Calcium Carbonate Precipitated | Purecal U | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.0 |
| Magnesium Silicate | Mistron Vapor | 60–70 | 2.75 | 2 | 9.0–7.5 |

TABLE II

| Type Oil | Oil Code # | Viscosity ssu | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

G. Method of Fabrication of Adhesive Compositions

Because of the significant advances in the packaging technology, the hot melt adhesive compositions can be used by conventional polymer fabricating techniques. After the blending is complete, the adhesive mass can either by extruded and/or calendered to a uniform thickness on top of the substrated which would be paper, cloth, aluminum foil or glass fabric. The temperature and the throughput of the extrusion are variable depending upon the viscosity of the tackifying mass and the desired coating thickness. Typically, the temperature of extrusions and rolls may be from about 200° to 400° F. The substrates or backings to which the pressure sensitive adhesive compositions are applied may be of various porous or nonporous types and they may be In this example, the following blends (composition shown in Table III) were prepared on a two-roll mill by compounding the ingredients together until a homogeneous flux was obtained. The compounds were prepared on an electric mill which was kept at 110° C. The polymer with plasticizer was banded initially and then the resin was introduced. Mixing time was approximately 15 minutes. During the melt state, the compounds appeared homogeneous. Upon cooling at room temperature, the compounds became hard and waxy. In some formulations, an oil, Tufflo-6056, was added to the compounds to lower their viscosity and hence improve their processability. It was noticed that the addition of oil, in some cases, improved the tackiness of the blend.

The various physical property measurements on these blends were made in the usual way and are shown in Table IV. The tensile data were on an Instron tensile testing machine. The samples were pulled with a crosshead speed of 2"/min. at room temperature. For adhesive characteristic measurements of these blends, samples were compression molded in-between mylar sheets and measurements of traces necessary to separate them were carried out with Instron. Comparing the various numbers of Table IV, it can be noted that the peal strength of the blends incorporating the tackifying results is ten-times higher than samples without the resins, for example, compare blend No. 1-1 vs. 1-2 and 1-1 vs. 1-4.

TABLE III

Composition of Adhesive Blends Incorporating Sulfonated Syndiotactic Polybutadiene and Tackifying Resins

|  | 1-1 | 1-2 | 1-3 | 1-4 | 1-5 |
|---|---|---|---|---|---|
| Zn Sulfonated 1,2-Syndiotactic Polybutadiene (32.5 moles $H_2SO_4$/100 gm. Polymer) | 100 | 100 | 100 | | |
| Zn Sulfonated 1,2-Syndiotactic Polybutadiene (20 moles $H_2SO_4$/100 g. polymer) | | | | 100 | 100 |
| Escorez 2101 | | 100 | 100 | 100 | 100 |
| Stearic Acid | | 2 | 2 | 20 | 20 |
| Tufflo Oil 6056 | | | 40 | | 40 |

TABLE IV

PHYSICAL PROPERTIES OF THE BLENDS

|  | 1-1 | 1-2 | 1-3 | 1-4 | 1-5 |
|---|---|---|---|---|---|
| Tensile psi | 2150 | 1050 | 410 | 870 | 290 |
| Elongation % | 550 | 750 | 1200 | 725 | 1100 |
| Tackiness | no tack | no tack | very slight tack | no tack | very slight tack |
| Peel Strength lbs. plateau | .10 | 1.02 | .12 | 1.1 | .07 |
| type of failure | AF | AF erratic | AF | AF erratic | AF |

EXAMPLE 2

In order to determine the compatibility and tackifying properties of sulfonated 1,2-syndiotactic polybutadiene with various tackifying resins, various blends were made according to the formulations shown in Table V. The physical properties were determined according to the procedure of Example 1 and are reported in Table VI.

The peel strength values were obtained by a method similar to ASTM D-429 adhesion test. In brief, the samples were sandwiched between Mylar sheets and pressed to a thickness of about 25 mils using a hot press. Rectangular strips of ½" width and 3" long were cut and 90° peel tests were performed on an Instron at room temperature. The resin-free sections of the Mylar film were clamped into air jaws to avoid any slippage during pulling. The samples were pulled at 2"/min. crosshead speed. The force and elongation of the samples were recorded on a strip recorder. The force necessary to separate the Mylar sheets was taken as the peel strength of the blend. Various runs were made and the average of the initial peak values were recorded and are reported in Table VI. It is noted that blends exhibit respectable degrees of melt adhesive properties.

Blends incorporating Escorez resins have twice the peel strength over those of Wingtak resins. It is clear from these data, that aggressiveness of tack of these blends can be controlled by the proper choice and loading of the tackifying resins.

TABLE V

Adhesive Compositions of Sulfonated 1,2-Syndiotactic Polybutadiene with Petroleum Resins

|  | 3-1 | 3-2 | 3-3 |
|---|---|---|---|
| Sulfonated 1,2-Syndiotactic Polybutadiene (RB 820) | 100 | 100 | 100 |
| Escorez 2101 | 100 | | |
| Escorez 1315 | | 100 | |
| Wingtack 95 | | | 100 |
| Tufflo 6056 | 100 | 100 | 100 |

TABLE VI

Physical Properties of Blends of Table V

|  | 3-1 | 3-2 | 3-3 |
|---|---|---|---|
| Tensile psi | 294 | 370 | 235 |
| Elongation % | 1450 | 1250 | 750 |
| Tackiness | slight tack | slight tack | slight tack |
| Peel Strength (lbs-plateau) | .7 | .55 | .27 |
| Type of failure | AF | AF | AF |

EXAMPLE 3

In this example, Zn sulfonated 1,2-syndiotactic polybutadiene was compounded, according to the procedure of Examples 1 and 2, with various resins to ascertain its tackifying qualities with stearic acid used as a plasticizer.

The use of stearic acid, which is a preferential ionic/plasticizer, is to control and improve the processibility of the adhesive compound. The various properties of the blends prepared of this example are shown in Table VIII. It is noted that, with the use of ionic plasticizer, no detrimental effect on the adhesive properties of these blends occurs.

TABLE VII

Composition of Adhesive Compound with Ionic Plasticizer

|  | 4-1 | 4-2 | 4-3 | 4-4 | 4-5 |
|---|---|---|---|---|---|
| 1,2-Syndiotactic Zn Sulfonated Polybutadiene | 100 | 100 | 100 | 100 | 100 |
| Escorez 2101 | | 100 | | | |
| Escorez 1315 | | | 100 | | |
| Wingtack 95 | | | | 100 | |
| Wingtack 10 | | | | | 100 |
| Tufflo 6056 | | 100 | 100 | 100 | |
| Stearic acid | | 40 | 40 | 40 | 40 |

TABLE VIII

Properties of Blends of Table VII

|  | 4-1 | 4-2 | 4-3 | 4-4 | 4-5 |
|---|---|---|---|---|---|
| Tensile psi | 2033 | 225 | 260 | 235 | 620 |
| Elongation % | 925 | 925 | 950 | 525 | 1475 |
| Tackiness | no tack | slight tack | slight tack | slight tack | very slight tack |
| Peel Strength (lbs-plateau) | .15 | .18 | .30 | .74 | .19 |
| Type of failure | AF (erratic) | AF | AF | AF | AF |

What is claimed is:

1. A hot melt adhesive composition which consists essentially of:
   (a) a neutralized sulfonated 1,2-syndiotactic polybutadiene resin, said neutralized sulfonated 1,2-syndiotactic polybutadiene resin having about 5 to about 50 meq. of neutralized sulfonate groups per 100 grams of said neutralized sulfonated 1,2-syndiotactic polybutadiene resin, wherein said neutralized sulfonate groups of said sulfonated 1,2-syndiotactic polybutadiene polymer are neutralized with a counterion selected from the group consisting of ammonium, aluminum, antimony, iron, lead and Groups IA, IIA, IB and IIB of the Periodic Table of Elements; and (b) about 25 to about 250 parts by weight of a hydrocarbon resin of a petroleum or coal tar distillate per 100 parts by weight of said neutralized sulfonated 1,2-syndiotactic polybutadiene polymer.

2. A hot melt adhesive composition according to claim 1, wherein said neutralized sulfonate groups of said sulfonated 1,2-syndiotactic polybutadiene polymer are neutralized with zinc ions.

3. A hot melt adhesive according to claim 1 further including about 1 to about 50 parts by weight of an ionic preferential plasticizer per 100 parts by weight of said neutralized sulfonated 1,2-syndiotactic polybutadiene polymer, wherein said preferential plasticizer is selected from the group consisting of carboxylic acids having about 8 to about 22 carbon atoms, metallic salts of said carboxylic acids, amides having an aliphatic group of about 8 to about 22 carbon atoms, amines, ureas and thioureas and mixtures thereof.

4. A hot melt adhesive composition according to claim 3, wherein said sulfonated neutralized 1,2-syndiotactic polybutadiene polymer contains about 7 to about 20 meq. of neutralized sulfonated groups per 100 grams of polymer.

5. A hot melt adhesive according to claim 4, wherein said preferential plasticizer is said metallic salt of said carboxylic acid.

6. A hot melt adhesive composition according to claim 4, wherein said metallic salt of said carboxylic acid is zinc stearate.

7. A hot melt adhesive composition according to claim 1 or 3 further including about 1 to about 150 parts by weight of a filler per 100 parts by weight of said neutralized sulfonated 1,2-syndiotactic polybutadiene, said filler being selected from the group consisting of calcium carbonates, silicas, carbon blacks, clays and talcs and mixtures thereof and/or less than about 100 parts by weight of an oil having less than 2 weight percent polars per 100 parts by weight of said neutralized sulfonated 1,2-syndiotactic polybutadiene polymer.

8. A hot melt adhesive composition according to claim 1 or 5 wherein said hydrocarbon resin has about 5 to 6 carbon atoms and consists of aliphatic dienes, mono- and diolefins and cyclic olefins.

* * * * *